March 13, 1962 R. D. COOK ET AL 3,025,338
OUTLET BOX SUPPORTS

Filed Nov. 14, 1958 2 Sheets-Sheet 1

INVENTORS.
Raymond D. Cook
William A. Lang
BY
*Mott Mackey & Burden*

THEIR ATTORNEYS

March 13, 1962  R. D. COOK ET AL  3,025,338
OUTLET BOX SUPPORTS
Filed Nov. 14, 1958  2 Sheets-Sheet 2

INVENTORS.
Raymond D. Cook
William A. Lang
BY Webb Mackey + Burden
THEIR ATTORNEYS

United States Patent Office 3,025,338
Patented Mar. 13, 1962

3,025,338
OUTLET BOX SUPPORTS
Raymond D. Cook and William A. Lang, Pittsburgh, Pa., assignors to Steel City Electric Company, Pittsburgh, Pa., a corporation of Pennsylvania
Filed Nov. 14, 1958, Ser. No. 773,938
1 Claim. (Cl. 174—63)

This invention relates to supports for outlet boxes, more particularly to an improved support for attaching an outlet box to a beam of a hung ceiling.

Due to the increasing cost of building construction, any device which simplifies existing installation procedures, thereby reducing labor costs, it is very valuable advance. Our invention accomplishes this result, providing a support which is easy to construct and simple to install. The prior art shows supports which are difficult to assemble, requiring a workman to make several adjustments and alignments. Our invention eliminates most of this difficulty. It discloses a support to which an outlet box can be attached by simply tightening one screw. The assembled box and support may then be fastened to a hung ceiling beam by fastening one more screw. The box may be rotated 360° to the desired position by slightly loosening the first screw and then retightening it with the box in the desired position, thereby practically eliminating bending of the conduits leading into the box.

We have shown a preferred embodiment of our invention in the accompanying drawings in which.

Supports embodying our invention comprise a U-shaped member 20 having a pair of legs 21 which fit around a carrying channel 22 and are secured thereto by a screw 23.

Figure 1:
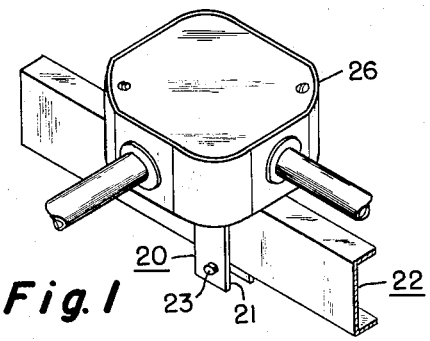
FIGURE 1 is a perspective view of an outlet box attached to a carrying channel for a hung ceiling by our support.
Figure 2:
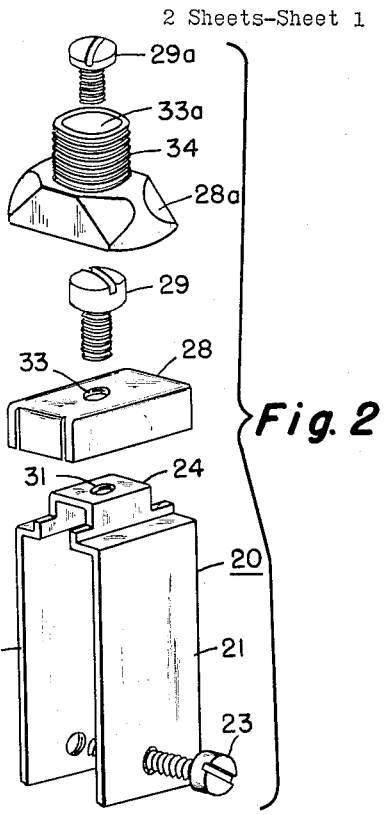
FIGURE 2 is an exploded perspective view of the support showing two alternative box fasteners.
Figure 3:
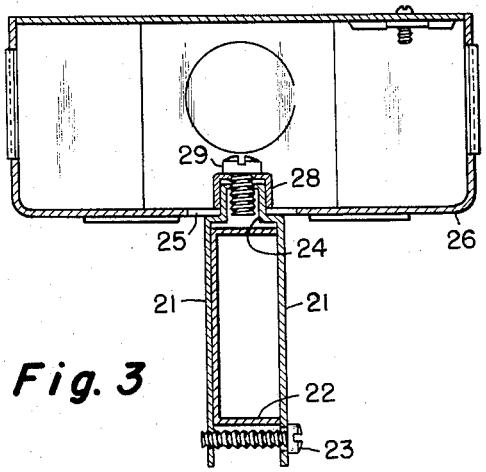
FIGURE 3 is a transverse section of the support.
Figure 4:
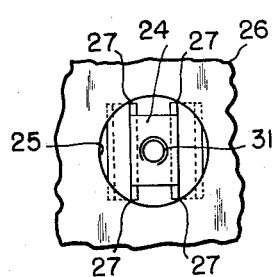
FIGURE 4 is a partial plan view of a portion of the support with an outlet box mounted thereon.
Figure 5:
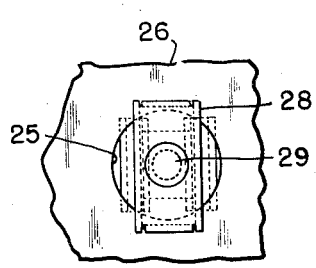
FIGURE 5 is a view similar to FIGURE 4 with a box fastener attached thereto.
Figure 6:
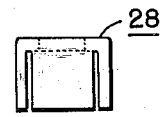
FIGURE 6 is a side view of a box fastener.
Figure 7:
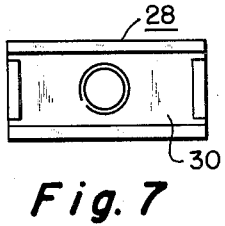
FIGURE 7 is a bottom view of a box fastener.
Figure 8:
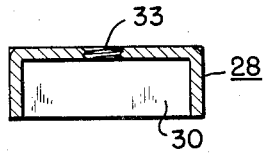
FIGURE 8 is a section view taken on the line VIII—VIII of FIGURE 6.
Figure 9:
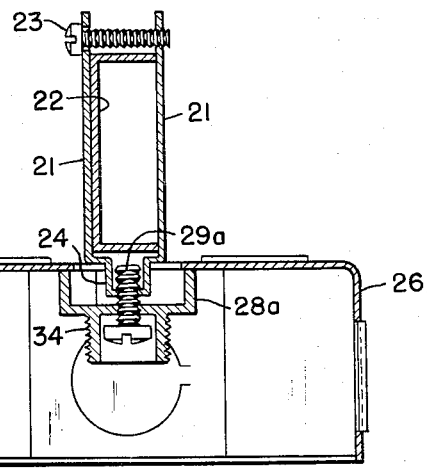
FIGURE 9 is a transverse section view of the support similar to that of FIGURE 3 with the alternative box fastener attached.
Figure 10:
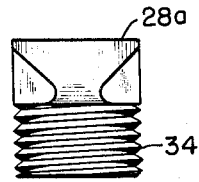
FIGURE 10 is a side view of the alternative fastener.
Figure 11:
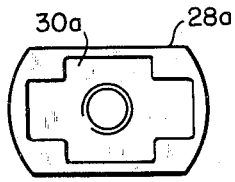
FIGURE 11 is a bottom view of the alternative fastener.
Figure 12:
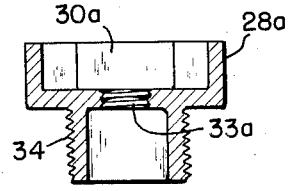
FIGURE 12 is a section of the alternative fastener taken on line XII—XII of FIGURE 10.

A box carrier 24, in the form of a projection, is formed integrally from the base of the U-shaped member. The length of the box carrier is slightly less than the diameter of an opening 25 in an outlet box 26. Such openings are conventionally formed in outlet boxes for mounting the boxes. Thus, as shown in FIGURE 4, the box carrier will fit through the opening in the box and the corners 27 of the box carrier engage the periphery of the opening 25 thereby automatically centering the outlet box.

A box fastener 28 carrying a screw 29 has a rectangular cavity 30 which is adapted to fit over the box carrier. The cavity is constructed just slightly longer and wider than the length and width of the carrier. Thus, when the box fastener is placed over the box carrier, it takes a position with respect to the box carrier which automatically aligns the locking screw 29 with a threaded bore 31 in the box carrier and also prevents turning of the box fastener with respect to the box carrier when the locking screw is being engaged. The outer periphery of the box fastener extends over the periphery of the opening 25 in the outlet box and thereby holds the outlet box firmly between the box fastener and the U-shaped member when the locking screw is fastened.

FIGURES 2 and 9–12 show an alternative box fastener 28a. This fastener has a cavity 30a and a locking screw 29a similar to cavity 30 and screw 29 of fastener 28. It is also provided with an externally threaded stud 34 extending therefrom for supporting fixtures.

The locking screws 29 and 29a extend through bores 33 and 33a in the box fasteners which bores are threaded with half threads so as to keep the screws and the box fasteners together when they are not secured to the box carrier.

It will be seen that our invention makes the installation of outlet boxes much easier. The outlet box is placed over the box carrier; the box fastener placed over the box carrier, automatically aligning the bores in the box carrier and the box fastener; and the locking screw fastened. The U-shaped member may be fastened to a carrying channel and held firmly in position by tightening the screw.

While we have described present preferred embodiments of our invention, it is understood that it may be otherwise embodied within the scope of the appended claim.

We claim:

A support for an outlet box having a mounting opening therein, the support being used to mount the box on a carrying channel, comprising: a U-shaped sheet metal member having two legs spaced parallel to but away from each other and a base joining the legs at one end of each leg portion, the ends of the legs away from the base being spaced from each other, the legs having sufficient length to extend beyond a cross-sectional dimension of the carrying channel, a screw passing through the legs adjacent their ends and across the carrying channel to secure said member to said carrying channel, said base having smooth surfaces and being bent to form a U-shaped projection having two sides extending from said base in a direction away from said legs and a third side connecting said two sides and extending at right angles to the plane of the legs, the width of said projection being less than the distance between said legs whereby shoulders are formed by portions of said base connected to said legs and the sides of the projection which extend away from said legs, the length of said projection being such that the projection fits closely within the mounting opening, said shoulders abutting against portions of the periphery of said opening when the projection is within said opening, a box fastener fitting over said projection and over portions of the periphery of the opening in the box on the side of the opening opposite to the side engaged by said shoulders, a tapped opening in the side of the projection extending at right angles to the legs and a locking screw passing through said fastener and threaded into said tapped opening to hold the box between said shoulders and said fastener.

References Cited in the file of this patent
UNITED STATES PATENTS

| | | |
|---|---|---|
| 1,332,690 | Rosenfeld | Mar. 2, 1920 |
| 1,723,866 | Knoderer | Aug. 6, 1929 |
| 2,914,601 | Fuss | Nov. 24, 1959 |
| 2,930,564 | Maier | Mar. 29, 1960 |